Patented July 16, 1929.

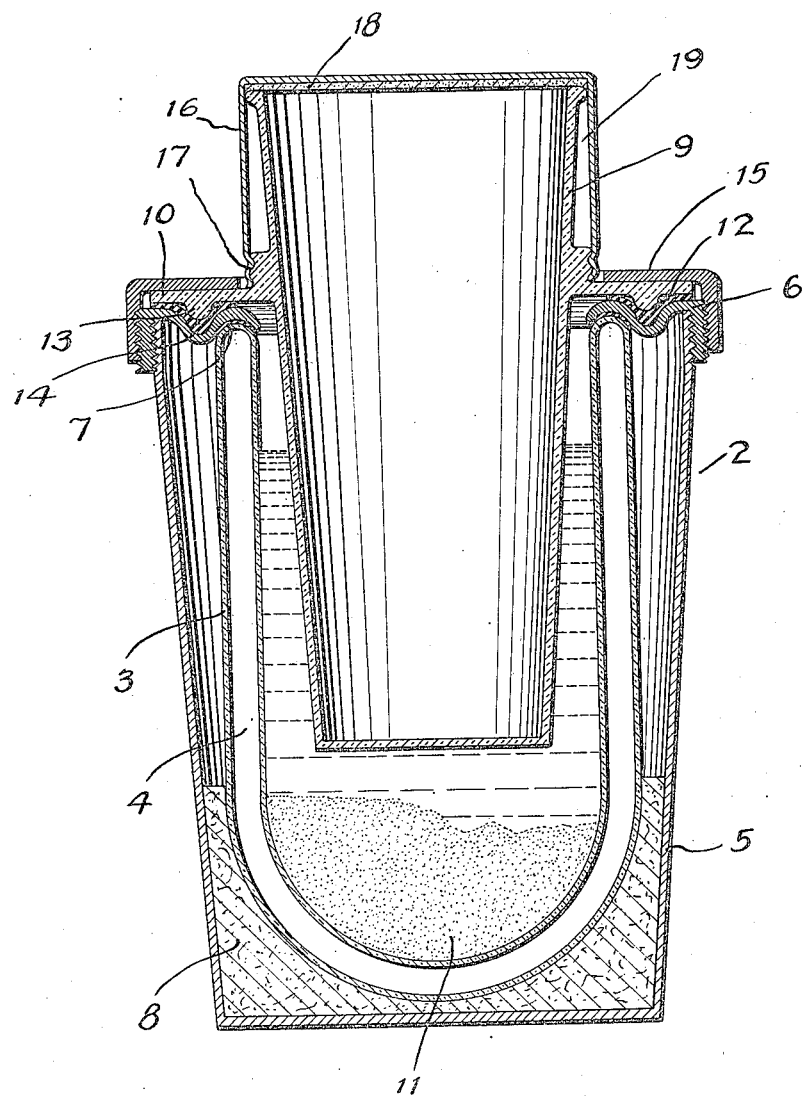

1,721,311

UNITED STATES PATENT OFFICE.

PETER J. MUENCHEN, OF NEW YORK, N. Y., ASSIGNOR TO ARCTIC REFRIGERATION MANUFACTURING CORPORATION, OF WILMINGTON, DELAWARE, A CORPORATION OF DELAWARE.

REFRIGERATING VESSEL.

Application filed September 28, 1925, Serial No. 59,032. Renewed January 16, 1929.

The object of the invention is to provide a convenient and effective device for chilling or freezing beverages, ices or the like by means of a freezing mixture. The freezing mixture is placed in an outer heat-insulated vessel, and the material to be chilled or frozen in an inner vessel provided with a tight closure, a tight, detachable connection being provided between the vessels. The device is adapted to be used as a shaker, the shaking serving the double purpose of agitating the freezing mixture to promote solution and of bringing all parts of the material in the inner vessel in contact with the chilled wall.

The accompanying drawing is a view in vertical section of the preferred embodiment of the invention.

The illustrated device is a hand shaker, designed to be held and shaken like a beverage shaker, for which it is adapted to be employed. An outer vessel 2 is composed of a cylindrical double-walled glass "vacuum" unit 3, the double walls of which enclose an evacuated space 4, and a protecting casing 5. The vacuum unit may be held in place by a ring 6 screwed on the rim of the casing and engaging over the rim of the unit 3, a gasket 7 being interposed between the ring and the unit. The vacuum unit is cushioned by suitable means indicated at 8.

The inner vessel 9, which may be of glass, has a lateral flange 10 on its upper portion, to rest on top of the outer vessel. The inner vessel depends below the flange 10 inside the heat-insulated outer vessel, leaving a space at sides and bottom to be occupied by the refrigerant mixture 11. A packing gasket 12 is placed between the flange 10 and the ring 6 forming the top of the outer vessel, and these elements may be formed with an annular rib 13 and channel 14, the better to grip the gasket. A clamping ring 15 taking over the flange 10 and screwing onto the outside of the part 6 of the outer vessel detachably connects the vessels together and forms a tight joint between them by compressing the gasket 12.

The top of the inner vessel has a tight cover 16, which preferably screws onto a thread 17 on the outside of the vessel adjacent its flange. A packing disk 18 in the top of this cover forms a tight joint with the rim of the inner vessel, and is also a heat insulation; and an air space 19 between the side of the cover and the wall of the inner vessel which extends above the outer vessel, is a further insulation.

In using this apparatus, the ring 15 is unscrewed, and the inner vessel is removed. The cover 16 is taken off the inner vessel, the material to be chilled or frozen is put in, and the cover is replaced. The material may be the ingredients of a beverage, water to be frozen or chilled, the ingredients of ice-cream or an ice, etc. The freezing mixture, consisting of water and a substance or substances which greatly lower the temperature as they go into solution, is then placed in the outer vessel, the inner vessel is then introduced, and the clamping ring 15 is then applied. The chilling of the contents of the inner vessel is hastened by shaking.

What I claim as new is:

A vessel for chilling or freezing comprising an outer vessel having double walls separated by an evacuated space and a casing for said walls, an inner vessel having a lateral flange resting on the outer vessel, and a clamping ring engaging said casing and over said flange.

PETER J. MUENCHEN.